Aug. 30, 1938.  F. W. MANNING  2,128,589
RECHARGEABLE FILTER
Original Filed Nov. 13, 1935    3 Sheets-Sheet 1
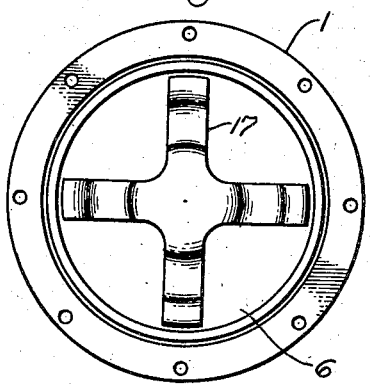
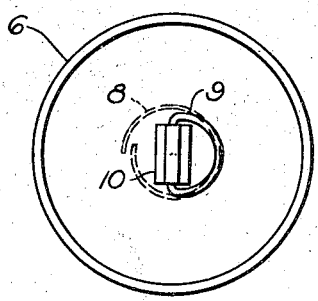
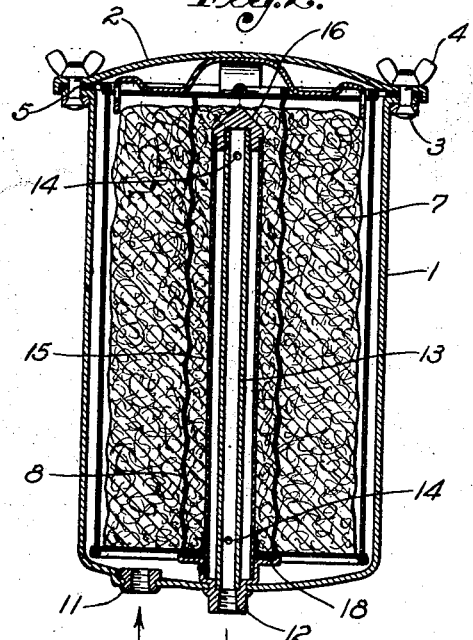
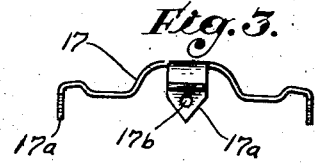
INVENTOR
Fred W Manning

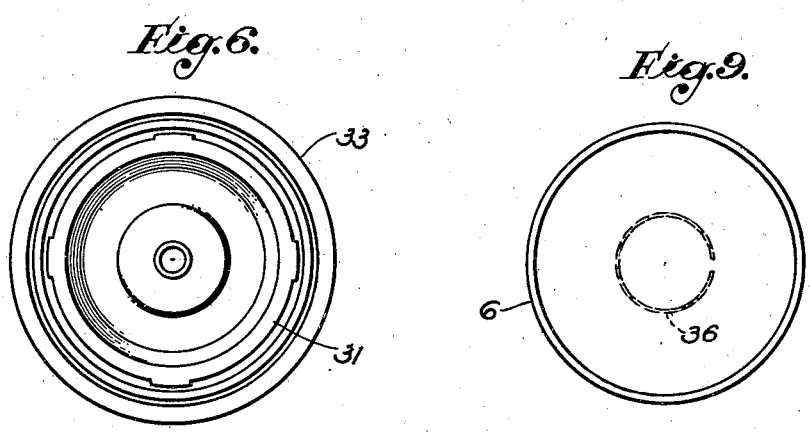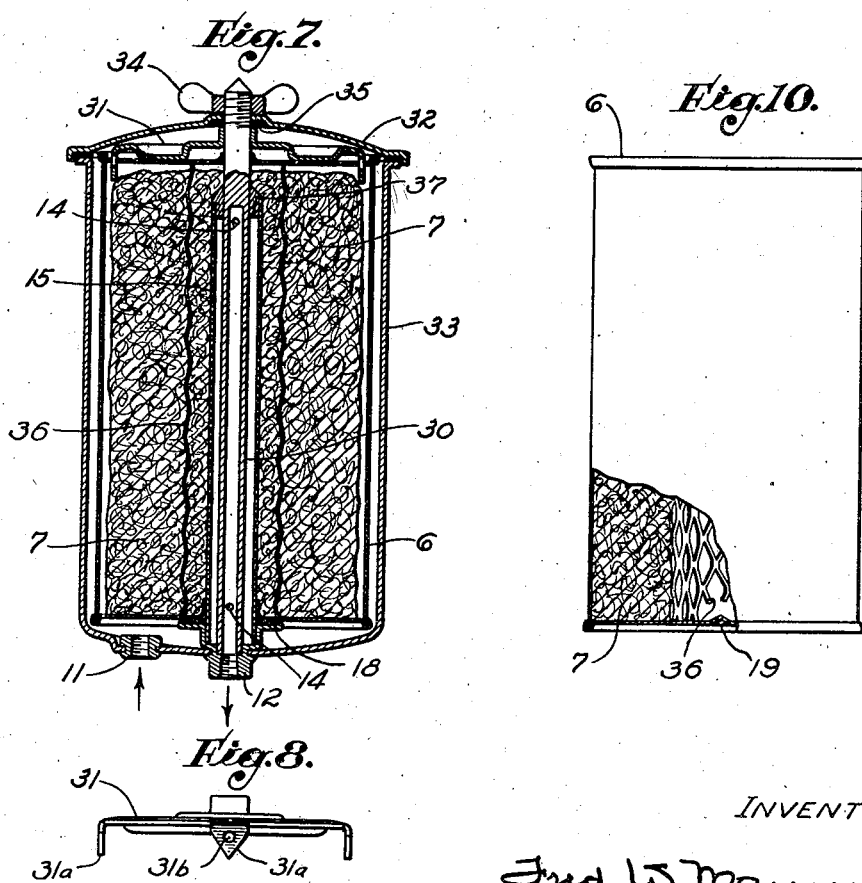

Aug. 30, 1938. F. W. MANNING 2,128,589
RECHARGEABLE FILTER
Original Filed Nov. 13, 1935 3 Sheets-Sheet 3

INVENTOR
Fred W Manning

Patented Aug. 30, 1938

2,128,589

UNITED STATES PATENT OFFICE 2,128,589

RECHARGEABLE FILTER

Fred W. Manning, Pasadena, Calif., assignor to F. W. Manning Company, Ltd., Los Angeles, Calif., a corporation of California Application November 13, 1935, Serial No. 49,471
Renewed January 31, 1938

12 Claims. (Cl. 210—131)

This invention is a continuation-in-part of an application, Serial No. 684,023, filed by me on August 7, 1933. My invention relates to the art of removing solids from liquids, and is more particularly directed to improved filter devices for removing the solid contaminations from the lubricating oils of internal combustion engines.

Internal combustion engines are commonly lubricated by oil which is taken from the crankcase and forced by a pump to the various parts to be lubricated, the oil then draining back into the crankcase. In the ordinary operation of internal combustion engines, especially when used in motor vehicles, the oil becomes contaminated with objectionable matter, such as carbon, road dust, and metal particles. This contamination is so great that it is common practice to periodically remove the contaminated oil from the engine and replace it with clean oil. To lessen the frequency of the oil changes, some motor vehicles are provided with a filter through which the oil from the crankcase is continuously circulated while the engine is running for the purpose of removing from the oil the most abrasive of the solid particles.

It has been the practice heretofore to remove solid impurities from crankcase oil by circulating the oil through sheet material such as a felted or woven fabric. In such fabric filters the solids are deposited on the surface of the fabric and build up a coating thereon and are therefore called surface type filters. To prevent rapid clogging, the felted or woven sheets are made sufficiently porous to allow the finer carbon particles to pass through, and after the sheets have been coated sufficiently with the larger solid impurities to retain the finer ones, the filtrate flow is not sufficiently rapid to remove the finer particles as quickly as formed in the engine. In either case the oil gradually becomes charged with carbon and darker in color and finally must be changed. Since such devices filter almost exclusively at the surface at which the oil enters and the effective life of the fabric is limited by the coating built up on its surface, the capacity of a surface type filter to remove solid matter is directly proportional to the area of its surface. Upon clogging of the fabric the complete filter is replaced.

The objects of my invention are to avoid the felting or weaving of the fibres into sheet formation, and replacement of the complete filters; but to supply the fibres in bulk in cheap replaceable containers, and thereby substitute the more efficient "depth type" of filters for the usual "surface type" of filters.

In accordance with my invention the filter is charged with a pseudo-gel or pressure mobile suspension such as is described in my Patent No. 2,093,090, dated September 14, 1937, and entitled "Filtering compositions". This pseudo-gel, or gel-like material, is formed of suitable fibres such as hair, wool, leather, wood, cotton, asbestos, slagwool, glass wool, or other filamentous material of animal, vegetable, or mineral origin, separately or together, in mixture with a lubricating oil in the proportion preferably of four to six ounces of fibres to each quart of oil. Other vehicles than oil may be used, provided the vehicle has similar characteristics to the fluid to be filtered in that it is not deleterious to the latter and will produce a sufficiently stable gel-like system. An extensive filtering medium is thus formed without the necessity of weaving or felting the fibres into a sheet prior to their introduction into the filter. In such a filter the foreign impurities are distributed throughout its depth rather than on its surface so that the filter's capacity should be very nearly proportional to its volume.

Further, in accordance with my invention, this gel-like filtering medium may be put up in sealed containers of tin or other material similar to the liquid tight containers used for canning vegetables and fruits; or the containers may have screwed or pressed in caps, or closure pieces of thin metal commonly used for canning many kinds of liquid materials. The introduction of a gel container into its receptacle, which may be connected to a by-pass line in the lubricating system of the engine, causes suitable perforations to be made in the container for passage therethrough of the oil or other liquid to be filtered. Darkening of the oil with carbon particles indicates that the gel fibres are beginning to be exhausted. The container may then be replaced with a fresh one, and the oil restored to its original clarity.

The invention is exemplified in the following description, and several modifications of the filter are illustrated by way of examples in the accompanying drawings, in which;

Fig. 1 is a plan view of the filter shown in Fig. 2 with the cover of the receptacle removed.

Fig. 2 is a vertical section of the filter showing the consolidation of the fibres after use.

Fig. 3 is an elevation of the piercing plate shown in Figs. 1 and 2.

Fig. 4 is a plan view of the container shown in Fig. 2.

Fig. 5 is a part elevation and part vertical section of the container shown in Fig. 2 before consolidation of the fibres has taken place.

Fig. 6 is a plan view of the filter shown in Fig. 7 with the cover of the receptacle removed.

Fig. 7 is a vertical section of a modified filter showing the consolidation of the fibres after use.

Fig. 8 is an elevation of the piercing plate shown in Figs. 6 and 7.

Fig. 9 is a plan view of the container shown in Fig. 7.

Fig. 10 is a part elevation and part vertical section of the container shown in Fig. 7 before consolidation of the fibres has taken place.

Figure 11:
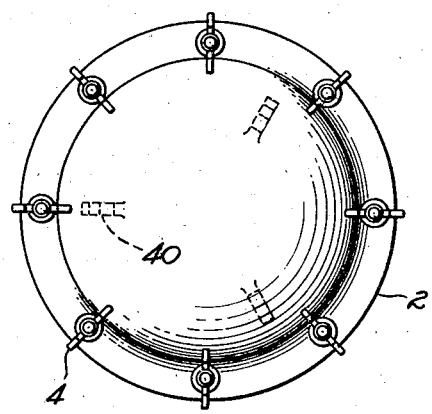
Fig. 11 is a plan view of the filter shown in Fig. 12.

Figs. 1 to 5 show a device in which the filter receptacle 1 is equipped with a cover 2, which is held in position by studs 3 and wing nuts 4, the gasket 5 making the joint between the receptacle and the cover. The container 6 encloses the filter element 7, which is supported by metal lath or some equivalent structure 8 and which may be embedded in the gel-mass at the time the container is filled and capped; and to the top of the container is attached a lifting ring 9 by means of a bracket 10. The liquid to be filtered enters the receptacle through the threaded inlet fitting 11 and after being filtered leaves by the threaded outlet fitting 12, which supports the container sufficiently above the bottom of the receptacle to permit circulation of the liquid to be filtered. Inner recessed portions of the outlet fitting also support and hold rigidly in place the filtrate thimble comprising: outlet pipe 13 in which are top and bottom drainage openings 14; the concentric foraminous retaining wall 15; and the thimble end piercing point 16, which is attached to the upper end of both. A pressure plate 17, positioned between the container top and receptacle cover and which may or may not be rigidly attached to the latter, is equipped with piercing points 17a having holes 17b therein; and it also acts as a pressure plate against the container to hold the latter firmly seated against the gasket 18 which is recessed in the outlet fitting. Depression 19 in the bottom of the container enables the operator to centralize the container on the thimble point before thrusting it down over the latter.

The operation of the apparatus thus constructed is in part indicated in connection with the foregoing description. Upon removal of the cover of the receptacle, a container may be sufficiently inserted within the receptacle for the central depression 19 in the bottom of the former to rest upon the piercing point of the thimble. The container can then be thrust down by hand over the thimble until the bottom of the former makes contact with the gasket 18, the point easily piercing the bottom of the container and the displaced gel liquid passing into and out through the thimble. The pressure plate is then placed above the container and the points of the former, after being centralized within the beading of the upper end of the container, are forced through the top by pressure exerted against the plate, either before or after the cover is placed in position, until a portion of each piercing point hole is positioned both above and below the container top. The division of the piercing plate into four arms, makes it sufficiently resilient to permit a reasonable variation in the depth of the gasket 18 recessed in the outlet fitting, without allowing the unfiltered liquid to enter the container at this point. After clamping down the cover of the receptacle the liquid enters through the inlet fitting 11, circulates around the outside of the container, which it enters through the holes in the points of the pressure plate, and after passing through the filter bed 7, retaining wall 15, openings 14 into the outlet pipe 13, leaves the receptacle by outlet fitting 12.

The retention of the impurities throughout the depth of the filter bed during passage of the liquid through the latter, will cause a certain amount of consolidation of the fibres around the thimble during the filtering period, which is likely to become permanent as the filter bed becomes clogged with impurities. However, until it does become permanent, a slight expansion and contraction of the bed will occur whenever the filtering pressure decreases or increases, respectively, which may at times result in a back-flow of the unfiltered liquid unless a check valve is placed in the inlet connection, or feed line. This movement of the filter bed under variations in pressure makes it desirable that the metal lath should move with the bed so as not to disrupt the latter and at the same time rigidly support it against a sagging action which would have a tendency to uncover the upper end of the thimble. The extent of the consolidation of the fibres in the filter bed, will depend mostly upon the amount of fibres in the gel-mass; and the expansion and contraction of the filter bed will depend upon the variations in the filtering pressure and the kind and length of the fibres used, until the bed becomes clogged with impurities after which further movement will cease. To permit sufficient movement of the metal lath it may be embedded in the gel-mass in a spiral form so as to surround the thimble when in use, as shown in Fig. 4; or it may be embedded in the fibres in an interrupted circle, as shown in Fig. 9. In the latter arrangement for ordinary purposes where the amount of fibres in the gel-mass is from four to six ounces to each quart of liquid, the space between the interrupted ends of the circle should be at least ten per cent of the length of the periphery of the circle.

Figs. 6 to 10 show a modification of the device just described in which the solid threaded upper pointed end of the filtrate outlet pipe 30 is extended through the top of the container, circular pressure plate 31, and cover 32, the latter being clamped down to the receptacle 33 by means of the wing nut 34. The plate has piercing points 31a having holes 31b therein, the underside of the plate being in pressural contact with the top of the container, and the upper central portion making a joint with the cover by means of a gasket 35 thereby preventing creepage of the oil into the container around the solid end of the outlet pipe. The metal lath supporting structure 36 is cylindrical in shape with its circumferential edges sufficiently spaced to allow for the consolidation of the fibres about the thimble before meeting each other. In this filter arrangement, the container, after being centered on the solid pointed end of the outlet pipe, is thrust down until it meets the beveled edges of the thimble end 37. An additional thrust will then carry it down into operating position.

Figure 13:
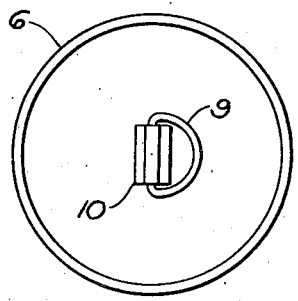
Fig. 13 is a plan view of the container shown in Fig. 12.
Figure 12:
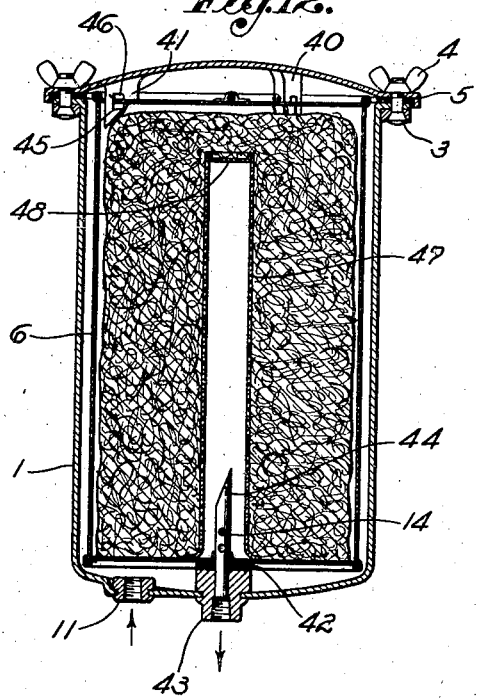
Fig. 12 is a vertical section of another modified filter showing the consolidation of the fibres after use.
Figure 14:
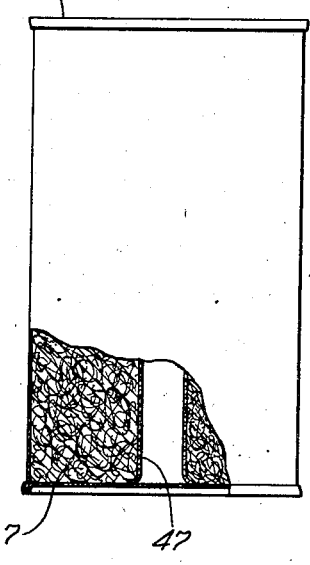
Fig. 14 is a part elevation and part vertical section of the container shown in Fig. 12 before consolidation of the fibres has taken place.

Figs. 11 to 14 show another modification in which the inlet piercing points 40 are attached to the cover. In this arrangement the bearing surface portion 41 of the points is used to hold the container in pressural contact with the gasket 42, the latter being supported by the outlet fitting 43 and held in central position by the short outlet pipe 44, whose chamfered open end is used to pierce the container. The piercing points are cut away at 45 and 46 to permit entrance of the oil after the points have pierced the container. The thimble or circular retaining wall 47 is attached to the bottom of the container, the upper end being closed by a pressed-in cap 48, instead of a pointed end, so as to support the filter bed against sagging. This construction will be particularly effective for supporting the fibre mass if a sufficient space exists above the flat end of the thimble to allow for a reasonable depth of filter bed to build thereover. This supporting action against sagging of the filter bed can also be augmented by increasing the length of fibres used in the gel-mass, as, for instance, from cotton linter dust, to first or second cut cotton linters. A foraminous cylindrical structure of metal lath, or coarse wire mesh, such as is described in connection with Figs. 1 to 10, or Figs. 15 to 18, may also be used for supporting the filter bed.

It will be evident from the foregoing description that the filter bed supporting element may be any foraminous structure that will allow the filter bed particles to embed themselves therein; that will remain sufficiently rigid axially to prevent substantially any sagging of the filter bed; and that is sufficiently resilient to expand or contract with the movement of the filter bed without danger of disrupting the latter.

It will be understood throughout the specification and appended claims that the word "cylindrical" includes both spiral and any interrupted circular or other thimble enclosing shape when used in connection with structures for supporting the filter bed.

I claim as my invention:

1. A filter comprising: a container enclosing a filtering material; and a receptacle with a detachably connected cover for the container, the receptacle having fluid inlet and outlet openings, and the receptacle and cover each having a pointed projection respectively adjacent thereto for piercing the container with fluid inlet and outlet openings, whereby the introduction of the container into the receptacle and closing of the cover causes the said openings to be made in the container, the inlet openings of receptacle and container to be connected, and the outlet openings of the container and receptacle to be connected, for passage through the filtering material of the fluid to be filtered.

2. A filter comprising: a container enclosing a filtering material; and a receptacle with a detachably connected cover for the container, the receptacle having a fluid inlet opening and a fluid outlet conduit, and the cover having means adjacent thereto for piercing the container with a fluid inlet opening, whereby the introduction of the container into the receptacle and closing of the cover causes the said conduit to be thrust within the container to become the fluid outlet therefor, and the said means to pierce the container with a fluid inlet opening, and the fluid inlet openings of the receptacle and container to be connected, for the passage through the filtering material of the fluid to be filtered.

3. A filter comprising: a container enclosing a filtering material; and a receptacle with a detachably connected cover for the container, the receptacle having a fluid inlet opening and a fluid outlet conduit, and the cover having means adjacent thereto for piercing the container with a fluid inlet opening, whereby the introduction of the container into the receptacle causes the said conduit to be thrust within the container to become the fluid outlet therefor, and the closing of the cover causes the said means to pierce the container with a fluid inlet opening, and the fluid inlet openings of the receptacle and container to be connected, for passage through the filtering material of the fluid to be filtered.

4. A filter comprising: a container enclosing a filtering material surrounding a centrally located foraminous thimble extending substantially the length of the container; and a receptacle with a detachably connected cover for the container, the receptacle having a fluid inlet opening and a fluid outlet conduit, and the cover having means adjacent thereto for piercing the container with a fluid inlet opening, whereby the introduction of the container into the receptacle causes the said conduit to be thrust within the foraminous thimble of the container to become the fluid outlet for the container and the closing of the cover causes the said means to pierce the container with a fluid inlet opening, and the fluid inlet openings of the receptacle and container to be connected, for passage through the filtering material of the fluid to be filtered.

5. A filter comprising: a container enclosing a filtering material; and a receptacle with a detachably connected cover for the container, the receptacle having a fluid inlet opening, a fluid outlet conduit, and a resilient pressure plate adjacent to the cover for piercing the container with a fluid inlet opening and holding the said container in position, whereby the introduction of the container into the receptacle and closing of the cover causes the said conduit to be thrust within the container to become the fluid outlet therefor, the pressure plate to come into pressural contact with the container and to pierce the container with a fluid inlet opening, and the fluid inlet openings of the receptacle and container to be connected, for passage through the filtering material of the fluid to be filtered.

6. A filter comprising: a container enclosing a filtering material; and a receptacle for the container, the receptacle having a fluid inlet opening, a fluid outlet conduit with a solid outer end, a cover through which the said outer end may be thrust to fasten the said cover to the receptacle, and a pointed projection for piercing the container with a fluid inlet opening, whereby the introduction of the container into the receptacle and closing of the cover causes the conduit to be thrust within the container to become the fluid outlet therefor, the solid outer end of the conduit to be thrust through the container and cover, the pointed projection to pierce the container with a fluid inlet opening, and the fluid inlet openings in the receptacle and container to be connected, for passage through the filtering material of the fluid to be filtered.

7. A filter comprising: a container enclosing a filtering material surrounding a centrally located foraminous thimble extending substantially the length of the container; and a receptacle for the container, the receptacle having fluid inlet and outlet openings and means within the receptacle for piercing the container for ingress of unfiltered fluid and egress of the filtered fluid, whereby the introduction of the container into the receptacle causes the said piercing of the container, the inlet openings of the receptacle and container to be connected, and the outlet openings of the container and receptacle to be connected, for passage through the filtering material of the fluid to be filtered.

8. A filter comprising: a container enclosing a filtering material; and a receptacle for the container, the receptacle having a detachably connected cover, a pointed outlet conduit, and other pointed projections, whereby the introduction of the container into the receptacle causes the pointed outlet conduit to be thrust within the container, and the closing of the cover causes the said other pointed projections to make other openings in the walls of the container for the entrance of the fluid to be filtered.

9. A filter comprising: a container enclosing a filtering material; and a receptacle for the container, the receptacle having fluid inlet and outlet openings and pointed projections within the receptacle for piercing the container with a fluid inlet opening and a fluid outlet opening whereby the introduction of the container into the receptacle causes both inlet and outlet openings to be made in the container, the inlet openings of the receptacle and container to be connected, and the outlet openings of the container and receptacle to be connected, for passage through the filtering material of the fluid to be filtered.

10. A filter comprising: a container enclosing a filtering material; and a receptacle with a detachably connected cover for the container, the receptacle having fluid inlet and outlet openings and pointed projections within the receptacle for piercing the container with a fluid inlet opening and a fluid outlet opening whereby the introduction of the container into the receptacle and closing of the cover causes both inlet and outlet openings to be made in the container, the inlet openings of the receptacle and container to be connected, and the outlet openings of the container and receptacle to be connected, for passage through the filtering material of the fluid to be filtered.

11. A filter comprising: a container enclosing a filtering material; and a receptacle with a detachably connected cover for the container, the receptacle having fluid inlet and outlet openings and pointed projections within the receptacle for piercing the container with a fluid inlet opening and a fluid outlet opening whereby the introduction of the container into the receptacle causes one of the said container openings to be made in the container, the closing of the cover causes the other of the said container openings to be made in the container, and the said introduction of the container into the receptacle and closing of the said cover causes the inlet openings of the receptacle and container to be connected, and the outlet openings of the container and receptacle to be connected, for passage through the filtering material of the fluid to be filtered.

12. A filter comprising: a container enclosing a filtering material; and a receptacle for the container, the receptacle having fluid inlet and outlet openings and means within the receptacle for piercing the container for ingress of unfiltered fluid and agress of the filtered fluid whereby the introduction of the container into the receptacle causes the said piercing of the container, the inlet openings of the receptacle and container to be connected, and the outlet openings of the container and receptacle to be connected, for passage through the filtering material of the fluid to be filtered.

FRED W. MANNING.